US012695624B2

(12) United States Patent
Völcker et al.

(10) Patent No.: US 12,695,624 B2
(45) Date of Patent: Jul. 28, 2026

(54) METHOD FOR SIGNING AN ENCODED VIDEO STREAM USING A PLURALITY OF DEVICES, AND A CORRESPONDING AUTHENTICATION METHOD

(71) Applicant: Axis AB, Lund (SE)

(72) Inventors: Björn Völcker, Lund (SE); Stefan Lundberg, Lund (SE)

(73) Assignee: AXIS AB, Lund (SE)

( * ) Notice: Subject to any disclaimer, the term of this patent is extended or adjusted under 35 U.S.C. 154(b) by 38 days.

(21) Appl. No.: 19/044,775

(22) Filed: Feb. 4, 2025

(65) Prior Publication Data

US 2025/0300838 A1     Sep. 25, 2025

(30) Foreign Application Priority Data

Mar. 21, 2024 (EP) ..................................... 24165083

(51) Int. Cl.
H04L 9/32 (2006.01)
H04L 9/06 (2006.01)
H04N 21/4405 (2011.01)

(52) U.S. Cl.
CPC ............ H04L 9/3247 (2013.01); H04L 9/065 (2013.01); H04N 21/4405 (2013.01)

(58) Field of Classification Search
CPC ..... H04L 9/3247; H04L 9/065; H04L 9/0891; H04N 21/4405; H04N 21/2343; H04N 19/40; H04N 21/835; H04N 19/467; H04N 21/234345; H04N 21/2347
See application file for complete search history.

(56) References Cited

U.S. PATENT DOCUMENTS

| | | | |
|---|---|---|---|
| 8,750,383 B2 * | 6/2014 | Milstein | H04N 19/1883 |
| | | | 375/240.19 |
| 2004/0101041 A1 | 5/2004 | Alexandre et al. | |
| 2006/0195886 A1 | 8/2006 | Ashley | |
| 2011/0150269 A1 * | 6/2011 | Yoshioka | H04N 21/8358 |
| | | | 382/100 |
| 2020/0127846 A1 | 4/2020 | Schneider et al. | |
| 2020/0162762 A1 | 5/2020 | Borsos et al. | |
| 2023/0325473 A1 | 10/2023 | Buffard et al. | |
| 2023/0362360 A1 * | 11/2023 | Lee | G06T 9/004 |
| 2025/0245886 A1 * | 7/2025 | Pesko | G06T 11/60 |

FOREIGN PATENT DOCUMENTS

| | | |
|---|---|---|
| CN | 111601113 B | 5/2022 |
| EP | 4020998 A1 | 6/2022 |
| JP | 2019186868 A | 10/2019 |
| WO | 2022049053 A1 | 3/2022 |

* cited by examiner

Primary Examiner — Sm A Rahman
(74) Attorney, Agent, or Firm — Volpe Koenig

(57) ABSTRACT

Signing of an encoded video stream using a first device and second device, wherein the first device provides the original signatures of a first encoded video stream, wherein the second device applies video processing to the first encoded video stream to modify the image frames thereof and include the modified image frames into a second encoded video stream. The second device determines difference data corresponding to the video processing and includes the difference data in the second encoded video stream. On a decoder side, the decoder can authenticate the received second encoded video stream by validating the original signatures using the difference data.

12 Claims, 5 Drawing Sheets

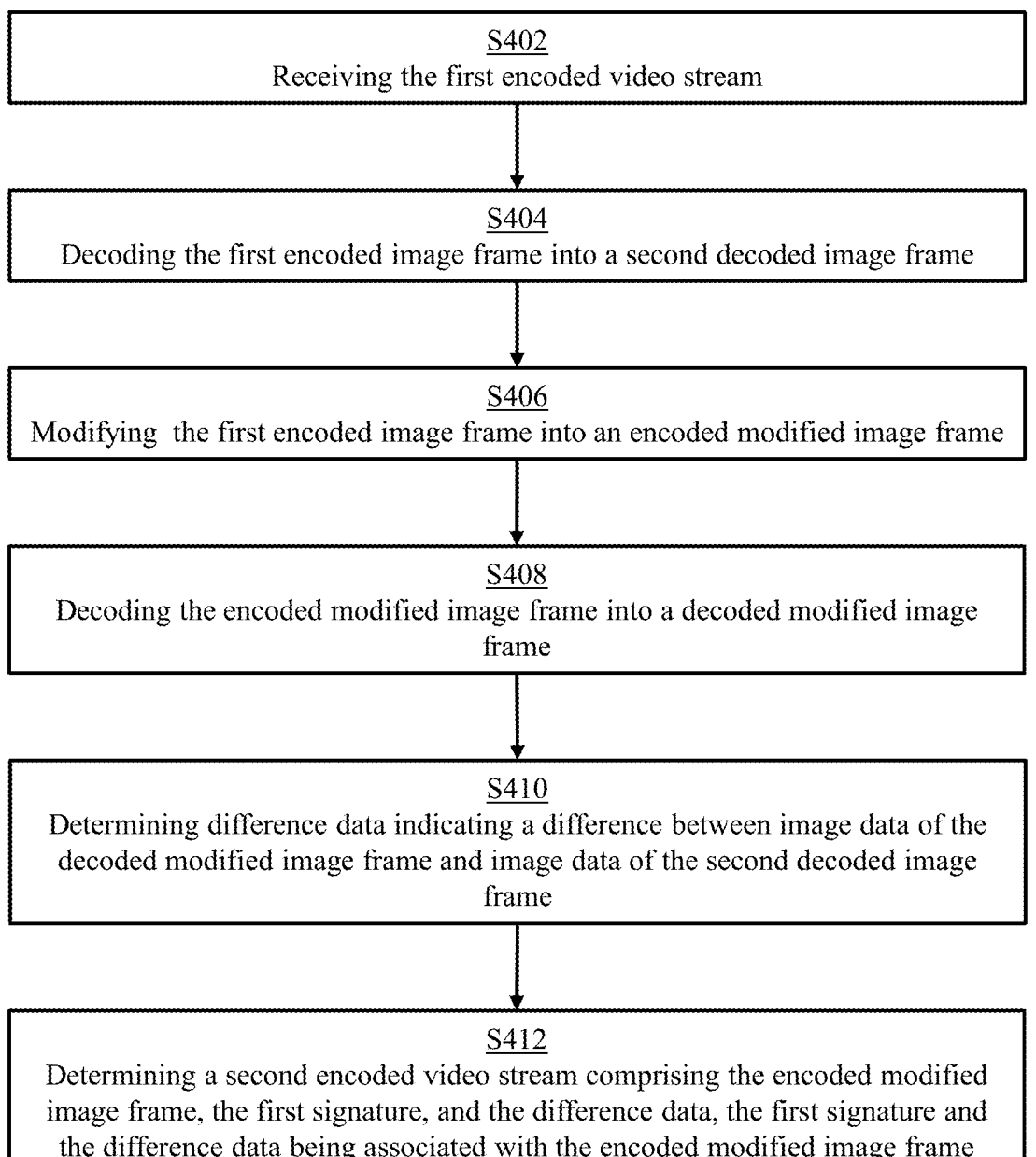

S402
Receiving the first encoded video stream

S404
Decoding the first encoded image frame into a second decoded image frame

S406
Modifying the first encoded image frame into an encoded modified image frame S408
Decoding the encoded modified image frame into a decoded modified image frame S410
Determining difference data indicating a difference between image data of the decoded modified image frame and image data of the second decoded image frame S412
Determining a second encoded video stream comprising the encoded modified image frame, the first signature, and the difference data, the first signature and the difference data being associated with the encoded modified image frame

Fig. 4

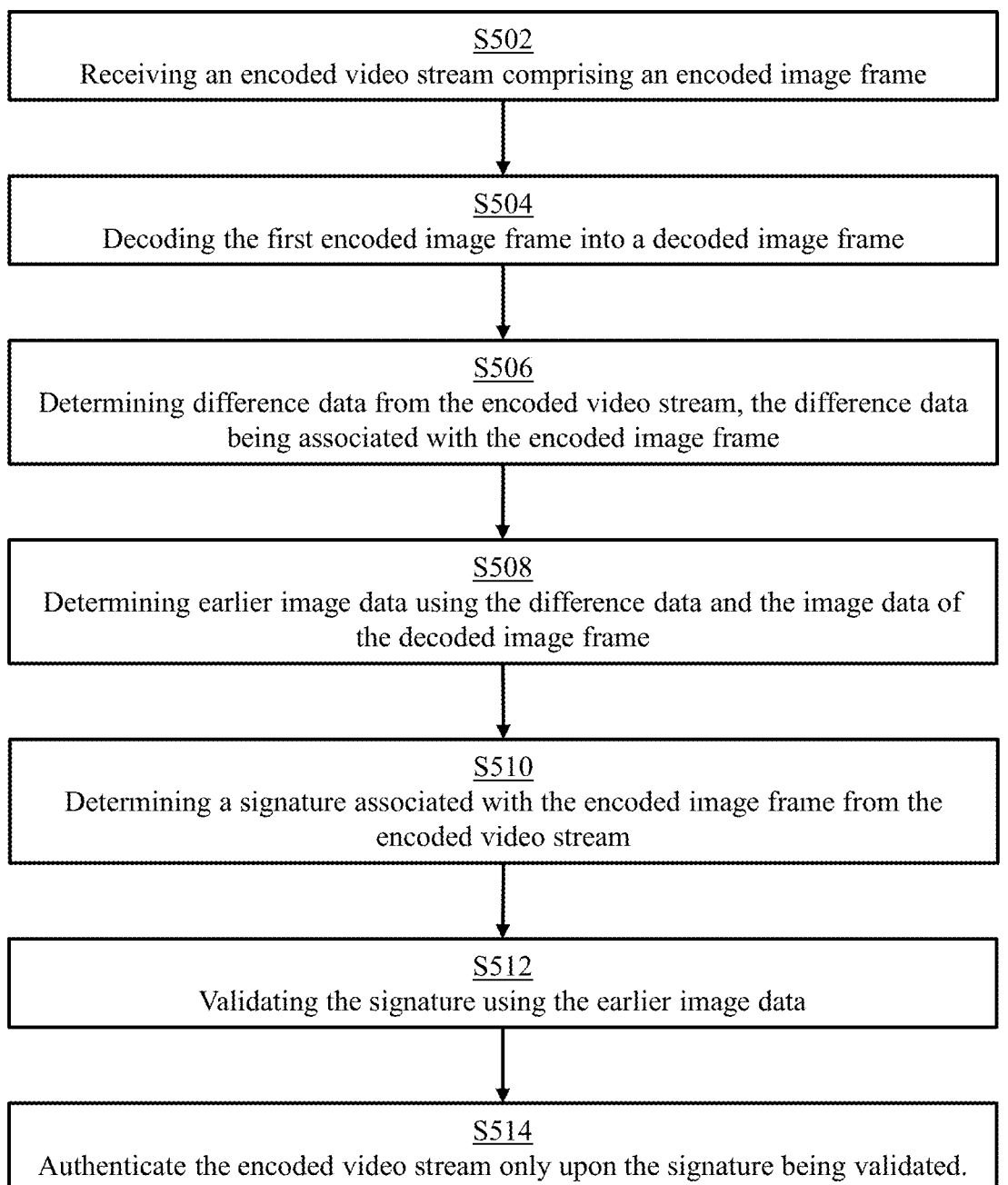

S502
Receiving an encoded video stream comprising an encoded image frame

S504
Decoding the first encoded image frame into a decoded image frame

S506
Determining difference data from the encoded video stream, the difference data being associated with the encoded image frame S508
Determining earlier image data using the difference data and the image data of the decoded image frame S510
Determining a signature associated with the encoded image frame from the encoded video stream S512
Validating the signature using the earlier image data S514
Authenticate the encoded video stream only upon the signature being validated.

Fig. 5

METHOD FOR SIGNING AN ENCODED VIDEO STREAM USING A PLURALITY OF DEVICES, AND A CORRESPONDING AUTHENTICATION METHOD

TECHNICAL FIELD

The present invention relates signing of encoded video, and in particular to signing an encoded video stream in a system comprising two devices wherein the second device modifies video encoded by the first device. The present invention further relates to an authentication of such encoded video stream.

BACKGROUND

Signing a video stream with a digital signature may be used for ensuring authenticity and integrity of the video stream. This process involves embedding a unique digital code into the video stream. This digital signature is created based on the content of the video stream and encrypted using the private key of the signer, typically the creator or distributor of the video stream. One purpose of this signature is to enable verification of the authenticity of the video stream and ensuring that it comes from the claimed source. When a viewer receives the video stream, they can use the public key of the signer to decrypt the signature and confirming the origin of the video stream.

In addition to verifying authenticity, the signature plays a crucial role in maintaining the integrity of the video stream. A positive validation using the signature ensures that the content has not been altered since it was originally signed. Any modification to the video would result in that the decrypted digital signature does not match the received video stream, thus indicating potential tampering. This feature is especially important in contexts where the legitimacy of video content is critical, such as in legal evidence.

However, a notable challenge with this method arises when legitimate alterations are made to the video stream. For instance, transcoding, which is the process of converting a video file from one format to another, is a common and often necessary action. Other entities may also legitimately alter the video content for various reasons, such as editing for length, for privacy filtering or adding informative overlays. The altered video stream, despite being legitimate in its new form, would fail the authenticity check because the signature no longer matches the altered video stream.

There is thus a need for improvements in this context.

SUMMARY

In view of the above, solving or at least reducing one or several of the drawbacks discussed above would be beneficial, as set forth in the attached independent patent claims.

According to a first aspect of the present invention, there is provided method for signing an encoded video stream using a first device and a second device, the method comprising, using the first device: encoding a first image frame into a first encoded image frame of a first encoded video stream; decoding the first encoded image frame into a first decoded image frame; determining a first signature using image data of the first decoded image frame; integrating the first signature in the first encoded video stream, wherein the first signature being associated with the first encoded image frame in the first encoded video stream.

As used herein, the terms "first", "second", do not refer to the sequential order of the frames, signatures, etc. Rather, it is simply a means of distinguishing one frame, signature, etc. from another for the purpose of describing or claiming the invention.

The first device typically corresponds to the original encoder of a captured video stream and may for example be implemented in a camera capturing the video stream.

The generation of the signature is based on the image data of a decoded version of a first encoded image frame. This involves creating a fingerprint of either the whole or parts of the image data from the decoded frame. Typically, this fingerprint is obtained using a hash algorithm or another suitable method. The fingerprint (e.g., hash, checksum, etc.) may then be encrypted, either on its own or as part of an aggregate fingerprint that includes additional fingerprints, using the private key of the first device, resulting in the signature of first encoded image frame in the first encoded video stream. Advantageously, validation of the original image data is facilitated, even if a downstream device applies video processing to the first encoded video stream, such as transcoding, privacy filtering, etc. It should be noted that the first signature can vary in its scope. In one example, the first signature is specific to the first encoded image frame alone, ensuring a precise and targeted validation of that particular frame. Alternatively, the first signature could represent a broader validation scope, encompassing a group of pictures (GOP) that includes the first encoded image frame. This flexibility allows for the signature to be tailored to either a single frame for detailed validation or to a sequence of frames for a more comprehensive validation.

The method further comprises using the second device: receiving the first encoded video stream; decoding the first encoded image frame into a second decoded image frame; modifying the first encoded image frame into an encoded modified image frame; decoding the encoded modified image frame into a decoded modified image frame; determining difference data indicating a difference between image data of the decoded modified image frame and image data of the second decoded image frame; and determining a second encoded video stream comprising: the encoded modified image frame, the first signature, and the difference data, wherein the first signature and the difference data being associated with the encoded modified image frame in the second encoded video stream.

The second device is configured to apply video processing to the received first encoded video stream, specifically to modify the first encoded image frame into the encoded modified image frame. The video processing could be applied directly to the first encoded image frame, for example to adjust bitrate, adjust framerate or apply frame cropping/scaling. In other embodiments, the video processing (such as transcoding, filtering, overlaying text, adjusting colour balance, etc.) is done on a decoded image frame, i.e., on the decoded version of the first encoded video frame received in the first encoded video stream. After processing, the processed image frame is re-encoded (the encoded modified image frame) for distribution or storage.

The modified image frame, once encoded, is subsequently decoded back into its altered state, referred to as the decoded modified image frame. This allows for a direct comparison between the image data of this processed frame, as it would appear after decoding, and the image data of the original, unprocessed frame from the first encoded video stream. Essentially, this process enables an evaluation of the video processing effects on the image frame against the original image data as it was initially encoded by the first device.

This evaluation leads to the identification of "difference data" which highlights the difference between the image data of the decoded modified image frame and the image data of the second decoded image frame. The term "image data" used herein is comprehensive, encompassing various forms, such as transformed pixel data (like a Fourier transform) or a direct comparison of pixel data. Furthermore, this difference data, once identified, can then be encoded for further use.

Advantageously, by providing the original signature (first signature) along with the encoded modified image frame and difference data, it becomes possible to validate the original content on the decoding side. This means that despite any alterations or processing the video has undergone, the authenticity and original state of the video can be verified against the initial signature. Moreover, the inclusion of difference data in the second encoded video stream allows for a detailed understanding of how the video has been altered from its original state. This may be crucial in applications where maintaining the integrity of the original content is essential, such as in legal scenarios, content auditing, or quality assurance. Furthermore, this method is compatible with videos that go through multiple stages of processing or transmission. Each stage can add its own layer of modifications and difference data, all the while retaining the ability to validate the original content.

In some examples, modifying the first encoded image frame into an encoded modified image frame comprises transcoding the first encoded video stream into the second encoded video stream. As used herein, transcoding includes changing of codec setting (change frame rate, change resolution, change video quality, change bitrate, etc.) or change codec (such as from H.265 to H.264).

In some examples, the method further comprises, using the second device: lossless encoding the difference between the image data of the decoded modified image frame and the image data of the second decoded image frame, wherein the difference data comprises the lossless encoded difference. Advantageously, bit rate may be reduced compared to including the raw difference data in the second encoded video stream. Lossless encoding ensures that the first signature still can be validated at a decoder side, since no information is lost in the process of encoding the difference data. The lossless encoding may for example be implemented using codecs applying Lempel-Ziv-Welch compression or any other suitable lossless codec.

In some examples, determining a second encoded video stream comprises integrating the signature of the first encoded image frame and the difference data into the second encoded video stream as video stream metadata. The video stream metadata may be one of: OBU Metadata as defined in AV1, registered or unregistered Supplemental Enhancement Information (SEI) as defined in H.26x, User Data in MPEG-2, VP9 Metadata, or any other suitable video stream metadata depending on the used codec for encoding.

In some examples, the method further comprises, using the second device: determining a second signature using image data of the decoded modified image frame; and integrating the second signature into the second encoded video stream, wherein the second signature is associated with the encoded modified image frame in the second encoded video stream. Advantageously, processing of the second encoded video stream may be facilitated at a third device, while still retaining the possibility to validate both the originally (first) encoded video stream as well as the second encoded video stream.

In some examples, a resolution of the first encoded image frame differs from a resolution of the encoded modified image frame, wherein the method further comprises, using the second device: applying a spatial sampling algorithm to the image data of the decoded modified image frame to achieve sampled image data having a same resolution as the image data of the second decoded image frame; wherein determining the difference data comprises using the difference between the sampled image data and the image data of the second decoded image frame.

In case the video processing results in a change of resolution of the encoded modified image frame as compared to the first encoded image frame, a spatial sampling algorithm may be applied to the image data of the decoded modified image frame using the second device. This algorithm adjusts the resolution of the modified image frame, either by upsampling (increasing resolution) or downsampling (decreasing resolution), to match the resolution of the second decoded image frame. The process of adjusting the resolution is known as spatial sampling. Once the resolutions are matched, it becomes possible to compare the two image frames effectively. Advantageously, even if the original and modified frames are at different resolutions, the spatial sampling algorithm allows for an accurate and meaningful comparison.

In some examples, the method further comprises, using the second device: decoding a third encoded image frame comprised in the first encoded video stream into a third decoded image frame; wherein modifying the first encoded image frame into an encoded modified image frame comprises determining merged image data by applying weighted merging of the image data of the second decoded image frame and image data of the third decoded image frame, and encoding the merged image data into the encoded modified image frame.

In this example, determining the difference data comprises: determining a first difference data indicating a difference between the image data of the decoded modified image frame and the image data of the second decoded image frame; and determining a second difference data indicating a difference between the image data of the decoded modified image frame and the image data of the fourth decoded image frame.

As used herein, weighted merging (may also be referred to as weighted blending) means combining two datasets (i.e., the image data of the second decoded image frame and the image data of the third decoded image frame) based on certain weights assigned to each. The weights can be any numerical value between 0 and 1, inclusive, as long as they add up to 1. If the weight is 0, it implies that the corresponding dataset will not contribute to the merged dataset. If the weight is 1, it implies full contribution of the corresponding image data to the merged dataset. Weights between 0 and 1 would suggest a partial contribution of the corresponding image data.

Advantageously, this example supports frame rate sampling at the second device, by providing two difference data, a difference data between the image data of the decoded modified image frame (the "merged" frame) and each of the image data used for the merging. The scheme may be extended in a similar way to include three or more image data in the merge process to achieve one merged image frame.

In this frame rate sampling scheme, the two (or more) image data may be decoded from encoded image frames in the first encoded video stream having separate signatures. In other examples, the two (or more) image data may be decoded from encoded images having a same signature, i.e., a GOP-based signature scheme.

According to a second aspect of the invention, the above object is achieved by a non-transitory computer-readable storage medium having stored thereon instructions for implementing the method according to the first aspect when executed on a device having processing capabilities.

According to a third aspect of the invention, the above object is achieved by a system for signing an encoded video stream, the system comprises a first device and a second device; wherein the first device comprises one or more processors; and one or more non-transitory computer-read-able media storing instructions executable by the one or more processors, wherein the instructions, when executed, cause the first device to perform operations comprising: encoding a first image frame into a first encoded image frame of a first encoded video stream; decoding the first encoded image frame into a first decoded image frame; determining a first signature using image data of the first decoded image frame; and integrating the first signature in the first encoded video stream, wherein the first signature being associated with the first encoded image frame in the first encoded video stream.

The second device comprises one or more processors; and one or more non-transitory computer-readable media storing instructions executable by the one or more processors, wherein the instructions, when executed, cause the second device to perform operations comprising: receiving the first encoded video stream; decoding the first encoded image frame into a second decoded image frame; modifying the first encoded image frame into an encoded modified image frame; decoding the encoded modified image frame into a decoded modified image frame; determining difference data indicating a difference between image data of the decoded modified image frame and image data of the second decoded image frame; and determining a second encoded video stream comprising: the encoded modified image frame, the first signature, and the difference data, wherein the first signature and the difference data being associated with the encoded modified image frame in the second encoded video stream.

The second and third aspect may generally have the same features and advantages as the first aspect. It is further noted that the disclosure relates to all possible combinations of features unless explicitly stated otherwise.

According to a fourth aspect of the invention, the above object is achieved by method for authenticating an encoded video stream, comprising: receiving an encoded video stream comprising an encoded image frame; decoding the first encoded image frame into a decoded image frame; determining difference data from the encoded video stream, the difference data being associated with the encoded image frame; determining earlier image data using the difference data and the image data of the decoded image frame; determining a signature associated with the encoded image frame from the encoded video stream; and validating the signature using the earlier image data; wherein the encoded video stream is authenticated only upon the signature being validated.

Advantageously, this aspect allows for the validation of the signature linked to the encoded image frame, even if subsequent video processing has modified the image data. Such modifications might normally prevent direct signature validation. The technique achieves this by utilizing the combination of decoded image data and difference data to reconstruct an earlier version of the image data, effectively the image data at the time the signature was determined.

As used herein, "earlier image data" may also be referred to as original image data. However, as described above, the earlier image data corresponds to an encoded and subsequently decoded version of the originally captured raw image data, resulting in potential differences due to the properties of the encoding (e.g., lossy encoding) that was first applied to the raw image data.

In some examples, validating the first signature comprises: decrypting the signature into a first hash value using a public key; determining a second hash value calculated from the earlier image data; and comparing the first hash value with the second hash value, wherein the first signature is validated upon the first hash value equals the second hash value.

The use of the public key, which is linked to the private key of the original signer (referred to as the first device), allows the decoder/validator to partially confirm the video stream's authenticity. This confirms that the video stream originates from the declared source. Furthermore, by generating a hash value from the earlier image data and comparing it with the decrypted hash value from the signature, the decoder/validator completes the authentication process. This ensures not only the source's authenticity but also verifies that any video processing performed by subsequent devices (such as the second device mentioned above) is done by an authenticated entity. This two-step process effectively secures the video stream, confirming both its origin and the integrity of its processing. In the process of validating the signature, it is important to note that the use of a hash function to generate a unique data fingerprint from the earlier image data is just one example. Other data fingerprinting algorithms can also be employed to achieve similar objectives of ensuring data integrity and authenticity. These algorithms, like hash functions, produce a unique identifier for a given set of data, facilitating the comparison between the expected and actual data fingerprints to validate the signature.

In some examples, the method further comprises determining a second signature associated with the encoded image frame from the encoded video stream; decrypting the second signature into a third hash value using a public key; determining a fourth hash value calculated from the image data of the decoded image frame; and comparing the third hash value with the fourth hash value; wherein the second signature is validated upon the third hash value equals the fourth hash value, and wherein the encoded video stream is authenticated only upon the second signature being validated.

Advantageously, this example provides further functionality for allowing the decoder/validator to confirm the video stream's authenticity, in this example that the video stream has been processed from the declared source (i.e., the second device) and that the encoded image frame (in particular the decodable image data thereof) has not been modified since the encoding made by the second device.

In some examples, the method comprises determining a size of the first difference data; and upon the size of the first difference data exceeding a threshold size, providing a warning of malicious video processing being applied to the encoded video stream. This condition arises because a larger-than-anticipated size of the difference data may suggest that the video processing undertaken by a subsequent device (referred to as the second device) may have significantly altered the content of the video stream in a manner that raises suspicions of tampering or unauthorized modifications.

According to a fifth aspect of the invention, the above object is achieved by a non-transitory computer-readable storage medium having stored thereon instructions for implementing the method according to the fourth aspect when executed on a device having processing capabilities.

According to a sixth aspect of the invention, the above object is achieved by a device for authenticating an encoded video stream, wherein the device comprises one or more processors; and one or more non-transitory computer-readable media storing instructions executable by the one or more processors, and wherein the instructions, when executed, cause the device to perform operations comprising: receiving an encoded video stream comprising an encoded image frame; decoding the encoded image frame into a decoded image frame; determining difference data associated with the encoded image frame from the encoded video stream; determining earlier image data using the difference data and the image data of the decoded image frame; determining a signature associated with the first encoded image frame from the encoded video stream; and validating the signature using the earlier image data, wherein the encoded video stream is authenticated only upon the signature being validated.

The fifth and sixth aspect may generally have the same features and advantages as the first aspect. Moreover, features from the first aspect may generally be implemented on the decoder side if needed, such as for example using only portions of the respective image data to validate the signatures, lossless decoding the difference data, and handling difference in resolution or frame rate. It is further noted that the disclosure relates to all possible combinations of features unless explicitly stated otherwise.

In some examples, there is provided a system comprising a device according to the sixth aspect and a display, wherein the system is configured for: displaying the earlier image data on the display. Consequently, the original video stream (as encoded by the first device) will be displayed, which may be advantageous in legal scenarios for example.

BRIEF DESCRIPTION OF THE DRAWINGS

The above, as well as additional objects, features, and advantages of the present invention, will be better understood through the following illustrative and non-limiting detailed description of embodiments of the present disclosure, with reference to the appended drawings, where the same reference numerals will be used for similar elements, wherein:

FIG. 4 shows a flow chart of a method performed by the second device of FIG. 1;

FIG. 5 shows a flow chart of a method performed by the device of FIG. 2.

DETAILED DESCRIPTION

Video streams, an integral part of modern communication, entertainment, and surveillance systems, often undergo various modifications, either for enhancement, privacy protection, or to meet specific transmission and storage requirements. However, these modifications (e.g., video processing) introduce significant challenges to maintaining the authenticity and integrity of the video content, particularly concerning verification through digital signatures.

Video processing such as the video editing and transcoding, alter the original video data, rendering traditional digital signatures ineffective for validating the integrity of the video content. Substituting the original signature with a new one following video processing necessitates trust in the device performing the operation, a condition that is not always feasible. Furthermore, this approach could readily lead to security vulnerabilities.

Figure 1:
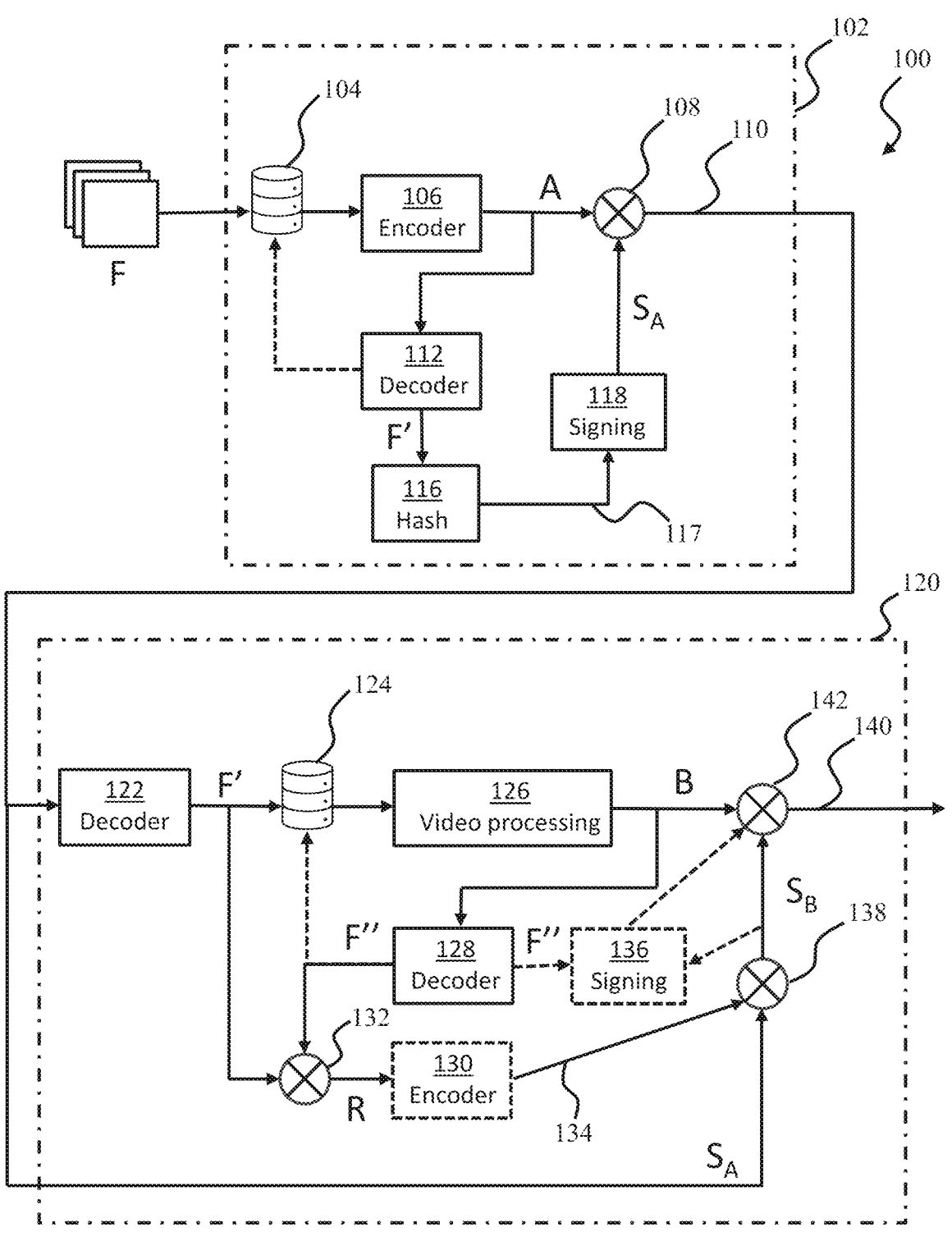
FIG. 1 shows, according to embodiments, a system for signing an encoded video stream, the system comprises a first device and a second device.

FIG. 1 shows by way of example a system 100 for signing an encoded video stream. The system comprises a first device 100, performing the original signing of captured image frames F. The system further comprising a second device 120 performing video processing video content in a first encoded video stream 110 received from the first device 102. The second device 120 outputs a second encoded video stream 140.

Figure 3:
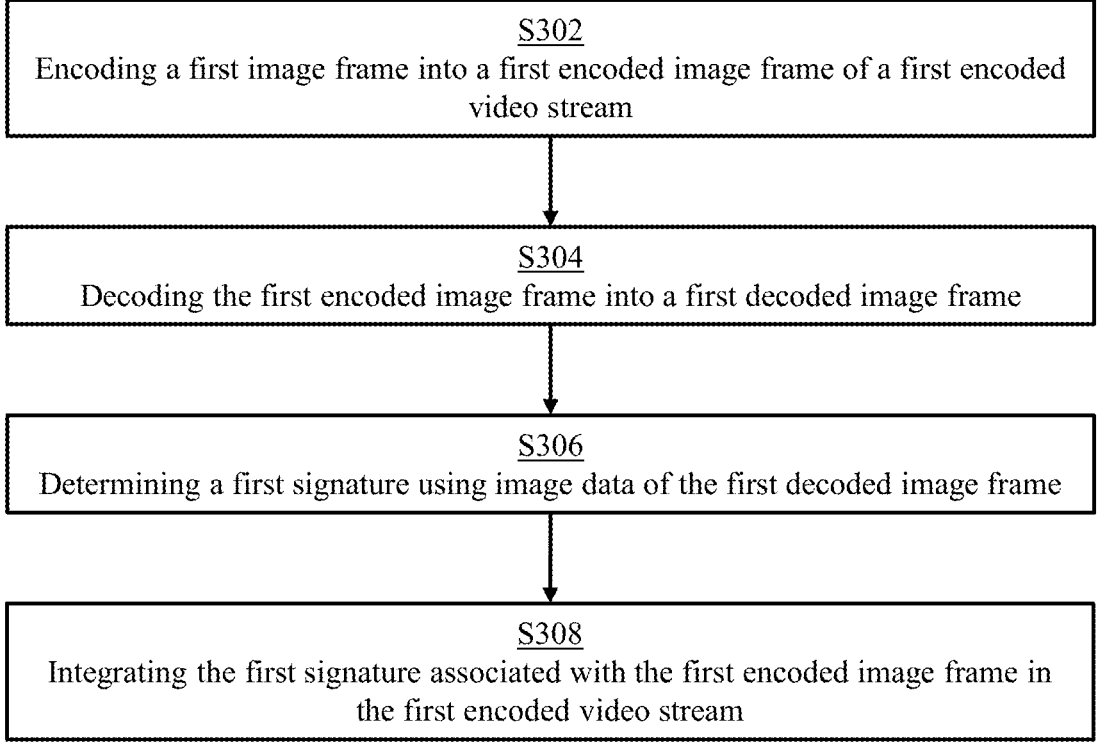
FIG. 3 shows a flow chart of a method performed by the first device of FIG. 1.

Functionality of the first device 102 will now be described in conjunction with the flow chart of FIG. 3.

The first device 102 may be implemented in a camera, for example a monitoring camera, or be coupled with a camera capturing image frames F depicting a scene of an indoor or outdoor environment. In some examples, the first device 102 is connected to a storage storing the image frames F.

The first device 102 comprises an encoder 106 configured to encode S302 a first image F into a first encoded image frame A. The encoder 106 may implement any suitable codec, such as H.264, H.265, H.266, AV1, VP9, MPEG-2, etc. It should be noted that when utilizing the MPEG-2 codec, all participating entities (such as the first and second devices 102, 120) must reach a consensus on the decoding methodology for the encoded video data. This is crucial because MPEG-2 encoding does not guarantee bit-exact outputs, meaning that the encoded streams might vary slightly across different devices or systems unless a standard decoding approach is established and adhered to.

The first device 102 further comprises a decoder 112 configured to decode S304 the first encoded image frame A into a first decoded image frame F'. Positioned within a standard encoding framework, the decoder 112 may thus, in some examples, feed the decoded image frame F' into a reference buffer 104. This setup ensures that the decoded image frame F' can be efficiently utilized in the predictive (P-frame) encoding process for succeeding image frames F, enhancing the encoding efficiency.

The first device 102 further comprises an image data identifier generator configured to determine at least one data identifier (e.g., fingerprint) of at least a part(s) of the image data of the first decoded image frame F'. For ease of explanation, in FIG. 1 (and similarly in FIG. 2), this functionality is represented by a hash algorithm, here implemented in a hashing unit 116. However, as described above, this is just by way of example and various other methods or algorithms capable of generating a unique identifier for the image data of the first decoded image frame F' can also be employed.

The at least one data identifier (e.g., hash) 117 is sent to a signing unit 118, that determines S306 a first signature SA using image data of the first decoded image frame F'. As described above, the signing unit 118 may generate a signature using the data identifier(s) derived from the image data of a single decoded image frame F'. Alternatively, in some embodiments, the signing unit 118 may process data identifiers obtained from multiple decoded image frames, such as a group of pictures (GOP), which are encoded by the encoder architecture within the first device 102 as previously mentioned. The signing unit 118 may thus construct the signature from a composite data structure, which could incorporate multiple data identifiers derived from several decoded image frames, such as the GOP. In this scenario, the 'signing data' for generating the digital signature typically includes, but is not limited to, the collected data identifiers, rather than direct image data. It is crucial to distinguish between the data identifier, which, in this context, is the hash value associated with individual or aggregated image frames, and the final digital signature. The digital signature may be generated through a process that involves more than mere encryption of hash values. Typically, a signing algorithm applies hashing to the composite of relevant data identifiers (signing data), and then encrypts this consolidated hash using a private key unique to the device 102. The private key is a component of a cryptographic key pair that includes a matching public key. These keys are mathematically connected, ensuring that data encrypted with the private key can only be decrypted with its corresponding public key.

The signature SA is appended 108 or otherwise associated with the first encoded image frame A, for example being included in a suitable video stream metadata frame (such as SEI for H.26x codecs) and added to a first encoded video stream 110. The first device 102 is thus configured to integrate S308 the first signature SA in the first encoded video stream 110, wherein the first signature SA is associated with the first encoded image frame A in the first encoded video stream 110. The inclusion of the digital signature SA serves as a verifiable seal, attesting to the authenticity and integrity of the first encoded image frame A at the time of signing. Since the signature is inextricably linked to the image data through the identifier(s) and the encryption process, any alteration to the data after signing would result in a mismatch during the verification process, thereby revealing any tampering. However, by basing the signature SA on the decoded version of the first encoded image A, downstream video processing applied to the encoded image A may be facilitated, as long as a device applying the video processing follows a scheme that now will be described in conjunction with FIG. 4.

The second device 120 of the system 100 shown in FIG. 1 is configured to receive S402 the first encoded video stream. The second device 120 comprises a decoder 122 configured to decode S404 the first encoded image frame A into a second decoded image frame F'. It should be noted that FIG. 1 uses the reference F' for both the decoded image frame produced by the first device 102 and the decoded image frame in the second device 120 (and similarly below in FIG. 2). This notation is used to highlight that, despite being processed in two separate devices, the content of these decoded frames F' are fundamentally the same, at least when considering their visual information. The video decoders implemented in both the first and second devices are required to conform to a bit-exact standard. This ensures that, aside from the previously noted exception for MPEG-2 which necessitates special considerations as discussed above, the decoding process across devices yields identical outcomes.

The second device 120 further comprises a video processing unit 126 configured to modify S406 the first encoded image frame A into an encoded modified image frame B. The video processing unit 126 may in some examples implement an encoder configured to transcode the first encoded image frame A as received in the first encoded video stream 110 into another format, e.g., encoding the image data of the second decoded image frame F' into an encoded modified image frame B. In other examples, the video processing unit may implement a range of video processing tasks on the image data from the second decoded image frame F'. This could include privacy filtering to obscure sensitive details, enhancing the image quality, or other adjustments. Following these modifications, the altered image data is then re-encoded into the encoded modified image frame B, ready for further use or distribution.

The second device 120 further comprises a decoder 128 configured to decode S408 the encoded modified image frame B into a decoded modified image frame F". Similar as described above for the first device, positioned within a standard encoding framework, the decoder 112 may thus, in some examples, feed the decoded image frame F' into a reference buffer 124. This setup ensures that, for example for transcoding implemented in the video processing unit 126, the decoded image frame F" can be efficiently utilized in the predictive (P-frame) encoding process for succeeding image frames, enhancing the encoding efficiency of the video processing unit 126.

The image data of the decoded modified image frame F" differs from the image data of the second encoded image frame F', which means that the signature SA cannot be verified using the image data of the decoded modified image frame F". To mitigate this, the second device 120 is configured to determine S410 difference data 134 indicating a difference (or residual) R between image data of the decoded modified image frame F" and image data of the second decoded image frame F'. The difference may be determined using a difference determining unit 132 configured to for example calculate a pixel by pixel difference R or calculate a frequency component difference R between the image data of the two decoded images F', F" capturing variations in the structural and textural characteristics of the two image data sets.

The second device 120 may in some examples comprise another encoder 130 configured for lossless encoding the difference R between the image data of the decoded modified image frame F" and the image data of the second decoded image frame F', wherein the difference data 134 comprises the lossless encoded difference. In other embodiments, the difference data 134 comprises the raw difference R. Furthermore, the functionality of encoder 130 can vary based on the specific application. For instance, it may be set up to focus on lossless encoding of the difference R pertaining to a single image frame F, emphasizing the alterations made for that specific frame by the second device 120. In other examples, the encoder 130 may adopt a broader approach similar to video encoding and encode the difference R by considering not just the immediate frame in question but also incorporating the differences relative to preceding and succeeding frames.

The second device 120 is then configured to determine S412 a second encoded video stream 140 comprising: the encoded modified image frame B, the first signature SA, and the difference data 134. The second device 120 is configured, for example using a combining unit 138 to form a "extended" signature SB comprising the first signature SA and the difference data 134 as side information to the first signature SA. The extended signature SB is appended 142 or otherwise associated with the encoded modified image frame B, for example being included in a video stream metadata frame (such as SEI for H.26x codecs) and added to a second encoded video stream 140. Consequently, the first signature SA and the difference data 134 are associated with the encoded modified image frame B in the second encoded video stream 140. Advantageously, a device (such as device 200 in FIG. 2) receiving the second encoded video stream may use the difference data 134 and the image data of the encoded modified image frame B to authenticate the second encoded video stream, by validating the original content (i.e., image data of the encoded image frame A), as will be described further below in conjunction with FIGS. 2 and 5.

In some examples, the second device 120 is configured to determining a second signature (using a signing unit 136) using image data of the decoded modified image frame F" and optionally also the signature SB (e.g., SA and difference data 134). This signature may be determined in a similar way as described above for the signing unit 118 of the first device, i.e., by using a private key of the second device 120. The second signature may then be integrated into the second encoded video stream 140, for example appended 142 or otherwise associated with the encoded modified image frame B, for example being included in a video stream metadata frame (such as SEI for H.26x codecs), and as such being associated with the encoded modified image frame B in the second encoded video stream 140. Advantageously, a device receiving the second encoded video stream may further authenticate the second encoded video stream, by further validating the source and integrity of the processed (modified) image frame B. This may be referred to as a nested signature scheme.

The system 100 depicted in FIG. 1 includes a first device 102 and a second device 120, with the latter processing the encoded video stream 110 received from the first device 102. It is important to mention that, although not shown in FIG. 1, the system can accommodate additional processing stages, potentially involving more devices beyond the first and second. The methods and techniques presented here are designed to support videos undergoing multiple processing or transmission phases. At each stage, unique modifications and corresponding difference data can be applied, yet the system maintains the capability to verify the video's original content.

Furthermore, the approach may include the practice of digitally signing the modified image frames (for instance, frame B as seen in FIG. 1).

In some examples, the resolution of the original encoded image frame A can be different from the resolution of the encoded modified image frame B. This discrepancy could arise due to various processing steps at the video processing unit 126, such as editing or transcoding, aimed at optimizing the second encoded video stream 140 for specific viewing platforms or storage requirements. To address this challenge and ensure compatibility between frames of differing resolutions, the second device 120 may apply a spatial sampling algorithm on the image data of the decoded modified image frame F". Spatial sampling is a process that adjusts the resolution of an image, either by downsampling (reducing resolution) or upsampling (increasing resolution). This adjustment results in sampled image data that has the same resolution as the image data of the second decoded image frame F', facilitating direct comparisons. Determining the difference R, then, involves comparing the sampled image data with the image data of the second decoded image frame F'. This comparison identifies and quantifies the changes or differences between the two, regardless of their original resolution discrepancies.

In some examples, the second device 120 may be configured for managing frame rates within the second encoded video stream 140, specifically through the process of weighted merging. This method involves decoding a further encoded image frame (not shown in FIG. 1, referred herein as the third encoded image frame) from the first encoded video stream 110 to produce a further decoded image frame (not shown in FIG. 1, referred herein as the third decoded image frame). The modification of the first encoded image frame into an encoded modified image frame in the video processing unit 126 is achieved by blending the image data from both the second decoded image frame F' and the third decoded image frame using a weighted merging technique. This blended, or merged, image data is then encoded into the encoded modified image frame B. The merging process is governed by specific weights assigned to the second and third decoded image frames, ranging from 0 to 1, inclusive. The total of these weights must equal 1. Assigning weights of 1 and 0 to the second and third decoded image frames, respectively (or the reverse), indicates that the merged image data is identical to the image data of one of the original decoded frames (i.e., one of the second decoded image frame F' and the third decoded image frame). This essentially means that the frame rate is adjusted by selecting every alternate image frame from the first encoded image stream 110. If the weights are between 0 and 1 (but not including 0 or 1), the merged image data will include contributions from both the second decoded image frame F' and the third decoded image frame.

The process also includes determining difference data in two parts: first, identifying the difference between the image data of the decoded modified image frame F" and the image data of the second decoded image frame F'; and second, identifying the difference between the decoded modified image frame F" and the image data of the third decoded image frame (not shown in FIG. 1). In this embodiment, in case the third encoded image frame is associated with a unique signature in the first encoded video stream 110, this unique signature is added to the modified signature SB and thus associated with the encoded (merged) modified image frame B.

As mentioned above each encoded image frame (A, B) can be linked to a signature that comprises one or more identifiers, such as fingerprints or hashes. In certain implementations, the image data from the first decoded image frame (F') is segmented into multiple sections. Each section generates its own hash (or a similar identifier) which are in combination referred to as signing data. The signing algorithm applies hashing to signing data, and then encrypts the resulting hash using the private key of the first device (102). Furthermore, in some scenarios, a single signature may correspond to a group of encoded image frames, for example, a Group of Pictures (GOP). Here, the hashes of all image frames within the GOP are considered as the signing data and used by the signing algorithm as described above. This singular signature is then associated with each of the encoded image frames that belong to the GOP, within the first encoded video streams (110, 120).

Pixel data within digital video streams can be represented in various formats, each with its unique method of organizing and storing information. Two common formats are I420 and NV12. For the system 100 to accurately process the encoded video streams 110, 140, all devices 102, 120 involved in the video processing pipeline need to understand and utilize the same pixel format. If the second device 120 in the processing chain is expected to perform operations on the first encoded video stream 110, such as decoding, editing, and encoding, the pixel format of the incoming video data in the first encoded video stream 110 must be compatible the processing capabilities of the video processing unit 126. If the pixel format of the first encoded video stream 110 is not known in advance, this may need to be communicated to the second device 120 or detected by the second device 120. This could be facilitated through metadata that accompanies the first encoded video stream 110 or by implementing a feature within the second device 120 that automatically detects the pixel format of the incoming video stream 110 and adjusts the processing parameters of the video processing unit 126 accordingly.

Processes and techniques for authentication of the second encoded video stream 140 will now be described in conjunction with FIGS. 2 and 5.

Figure 2:
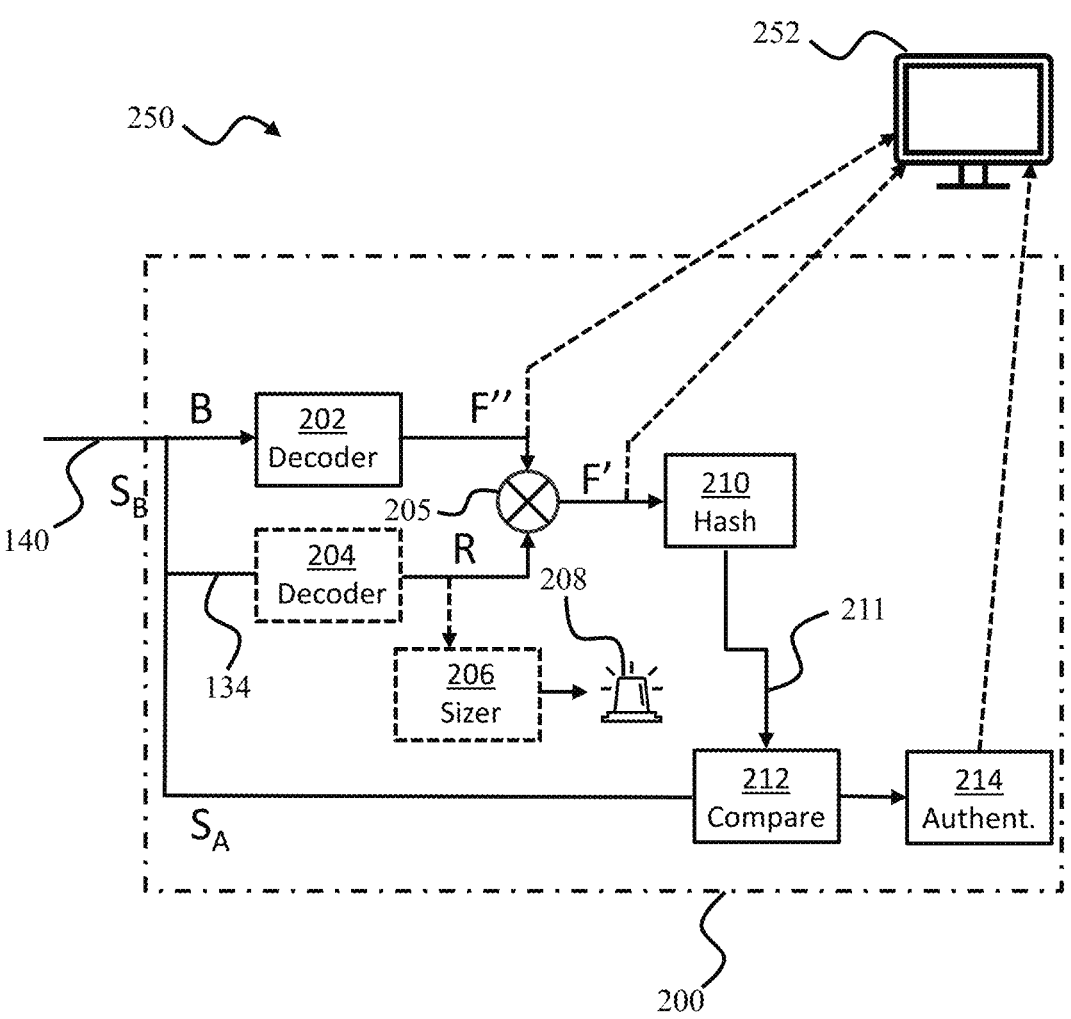
FIG. 2 shows a device for authenticating an encoded video stream, according to embodiments.

FIG. 2 shows a device 200 for authenticating an encoded video stream 140, i.e., the second encoded video stream 140 as provided by the second device 120. The device 200 will hereinafter be referred to as a decoder device.

The decoder device 200 is configured for receiving S502 the encoded video stream 140 comprising an encoded image frame B.

The decoder device comprises a first decoder 202 configured for decoding S504 the first encoded image frame B into a decoded image frame F". The signature SB associated with the first encoded image frame B comprises the original signature SA as well as the difference data 134. The decoder device 200 is thus configured to determining S510 the (original) signature SA associated with the encoded image frame B from the encoded video stream 140. The decoder device 200 is further configured to determine S506 difference data 134 associated with the encoded image frame B from the encoded video stream 140. In case the difference data 134 is encoded (lossless), the decoder device 200 may further comprise a second decoder 204 for decoding the difference data 134 into the difference R.

The decoding device 200 further comprises an image data combining unit 205 for determining S508 earlier image data (i.e., image data of an earlier decoded image frame F' corresponding to the first decoded image frame F' in FIG. 1) using the difference data R and the image data of the decoded image frame F". The earlier image data is used to determine a hash 211 (or another unique identifier as described above) using a hash unit 210. The signature SA is then validated S512 using the earlier image data. Specifically, the decoding device 200 comprises a comparing unit 212 configured to perform a validation of the signature SA using the earlier image data. If hash values are used, the comparing unit 212 is configured to decrypt the signature SA into a first hash value using a public key, compare the (second) hash value 211 calculated from the earlier image data with the first hash value, wherein the first signature SA is validated upon the first hash value equals the second hash value.

The (second) hash 211 is generated in the same way as when signing the video on the encoder side (e.g., in the first device 102). The public key is corresponding to the private key used by the first device 102 and successful decryption of the signature SA confirms that the encrypted video stream 140 originates from the declared source. In case the signature cannot be decrypted, the encrypted video stream 140 is not authenticated.

Depending on how the signing was implemented in the first and second devices, the decoding device 200 is correspondingly implemented. For example, if the signature SA comprises a plurality of hashes based on portions of image data of the same image frame, the hashing unit 210 is implemented similarly to produce a plurality of hashes 211 based on the same rule. Moreover, if the signature SA comprises a plurality of hashes based on image data from a plurality of image frames (e.g., a GOP), the comparing unit 212 implements the same rules by comparing the hashes from the signature SA with hashes determined from a plurality of image frames in the received encrypted video stream 140.

The decoder device 200 further comprises an authentication unit 214 implementing the authentication policies of the decoder device. The authentication unit received the outcome of the comparison performed by the comparing unit 212, i.e., if the first signature SA was validated or not. The authentication unit 214 is configured to authenticate S514 the encoded video stream 140 only upon the signature SA being validated.

In examples, the decoding unit 200 includes a component referred to as a sizer unit 206, which function is to measure the size of the first difference data, such as the magnitude of difference R. When the measured size of this difference data surpasses a predefined limit, the sizer unit 206 may activate a protocol to issue an alert 208. This alert 208 suggests that the video stream 140 may have undergone unauthorized or harmful (malicious) processing. The predetermined limit, or threshold, can be defined in numerous ways, including as an absolute number of bits or as a percentage relative to the bit size of the decoded image frame F" that the difference data 134 is associated with. This flexibility allows for the identification of significant alterations or processing by the second device 120, deemed excessive based on a predefined or dynamic criteria.

In case the second device 120 implements its own signing, e.g., signing based on the image data of the image frame decoded from the encoded modified image frame B, the decoding device 200 may implement the corresponding features. In one example (not shown in FIG. 2) the decoding device 200 is configured for:

determining a second signature associated with the encoded image frame from the encoded video stream;

decrypting the second signature into a third hash value using a public key;

determining a fourth hash value calculated from the image data of the decoded image frame; and comparing the third hash value with the fourth hash value, wherein the second signature is validated upon the third hash value equals the fourth hash value; and wherein the encoded video stream is authenticated only upon the second signature being validated.

In this example, the public key corresponds to the private key used by the second device 120.

The decoding device 200 may in some embodiments be part of a system 250 further comprising a display 252. The display 252 may be configured to display the earlier image data (of the earlier decoded image frame F') on the display. In other embodiments, the display 252 may be configured to display the image data of the decoded image frame F" or provide an option for a user to select between the two. In case F' is displayed, it is not possible to replace the original video content with adjusted content (F") for the purpose of misleading a user, since the adjusted video content are never displayed. The display 252 may in some examples be configured to display data from the authentication unit 214, such as for example if the displayed content is authenticated, the origin (e.g., ID of the first device 102) of the earlier image data or the origin (e.g., ID of the second device 120) of the image data of the decoded image frame F".

Generally, the devices (first, second, decoding) may comprise circuitry which is configured to implement the components/units of FIGS. 1-2. and, more specifically, their functionality. The described features of the devices can be implemented advantageously in one or more computer programs that are executable on a programmable system including at least one programmable processor coupled to receive data and instructions from, and to transmit data and instructions to, a data storage system. Suitable processors for the execution of a program of instructions include, by way of example, both general and special purpose microprocessors, and the sole processor or one of multiple processors or cores, of any kind of computer. The processors can be supplemented by, or incorporated in, ASICs (application-specific integrated circuits). Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. The components/units described herein represent instructions that may be stored in any type of computer-readable medium and may be implemented in software and/or hardware.

In summary, the present disclosure relates to signing of an encoded video stream using a first device and a second device, wherein the first device provides the original signatures of a first encoded video stream, wherein the second device applies video processing to the first encoded video stream to modify the image frames thereof and includes the modified image frames into a second encoded video stream. The second device determines difference data corresponding to the video processing and includes the difference data in the second encoded video stream. On a decoder side, the decoder can authenticate the original version of the received second encoded video stream by validating the original signatures using the difference data.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for signing an encoded video stream using a first device and a second device, the method comprising, using the first device:

encoding a first image frame into a first encoded image frame of a first encoded video stream;

decoding the first encoded image frame into a first decoded image frame;

determining a first signature using image data of the first decoded image frame; and integrating the first signature in the first encoded video stream, the first signature being associated with the first encoded image frame in the first encoded video stream;

wherein the method further comprises, using the second device:

receiving the first encoded video stream;

decoding the first encoded image frame into a second decoded image frame;

modifying the first encoded image frame into an encoded modified image frame;

decoding the encoded modified image frame into a decoded modified image frame;

determining difference data indicating a difference between image data of the decoded modified image frame and image data of the second decoded image frame; and determining a second encoded video stream comprising:

the encoded modified image frame, the first signature, and the difference data, wherein the first signature and the difference data are associated with the encoded modified image frame in the second encoded video stream, determining a second signature using image data of the decoded modified image frame; and integrating the second signature into the second encoded video stream, wherein the second signature is associated with the encoded modified image frame in the second encoded video stream.

2. The method of claim 1, wherein modifying the first encoded image frame into an encoded modified image frame comprises transcoding the first encoded video stream into the second encoded video stream.

3. The method of claim 1, further comprising, using the second device:

lossless encoding the difference between the image data of the decoded modified image frame and the image data of the second decoded image frame, wherein the difference data comprises the lossless encoded difference.

4. The method of claim 1, wherein determining a second encoded video stream comprises integrating the signature of the first encoded image frame and the difference data into the second encoded video stream as video stream metadata.

5. The method of claim 1, wherein a resolution of the first encoded image frame differs from a resolution of the encoded modified image frame, wherein the method further comprises, using the second device:

applying a spatial sampling algorithm to the image data of the decoded modified image frame to achieve sampled image data having a same resolution as the image data of the second decoded image frame;

wherein determining the difference data comprises using the difference between the sampled image data and the image data of the second decoded image frame.

6. The method of claim 1, wherein the method further comprises, using the second device:

decoding a third encoded image frame comprised in the first encoded video stream into a third decoded image frame;

wherein modifying the first encoded image frame into an encoded modified image frame comprises determining merged image data by applying weighted merging of the image data of the second decoded image frame and image data of the third decoded image frame, and encoding the merged image data into the encoded modified image frame;

wherein determining the difference data comprises:

determining a first difference data indicating a difference between the image data of the decoded modified image frame and the image data of the second decoded image frame; and determining a second difference data indicating a difference between the image data of the decoded modified image frame and the image data of the third decoded image frame.

7. A system for signing an encoded video stream, comprising a first device and a second device;

the first device comprising one or more processors; and one or more non-transitory computer-readable media storing instructions executable by the one or more processors, wherein the instructions, when executed, cause the first device to perform operations comprising:

encoding a first image frame into a first encoded image frame of a first encoded video stream;

decoding the first encoded image frame into a first decoded image frame;

determining a first signature using image data of the first decoded image frame; and integrating the first signature in the first encoded video stream, wherein the first signature is associated with the first encoded image frame in the first encoded video stream;

the second device comprising one or more processors; and one or more non-transitory computer-readable media storing instructions executable by the one or more processors, wherein the instructions, when executed, cause the second device to perform operations comprising:

receiving the first encoded video stream;

decoding the first encoded image frame into a second decoded image frame;

modifying the first encoded image frame into an encoded modified image frame;

decoding the encoded modified image frame into a decoded modified image frame;

determining difference data indicating a difference between image data of the decoded modified image frame and image data of the second decoded image frame; and determining a second encoded video stream comprising:

the encoded modified image frame, the first signature, and the difference data, wherein the first signature and the difference data are associated with the encoded modified image frame in the second encoded video stream, determining a second signature using image data of the decoded modified image frame; and integrating the second signature into the second encoded video stream, wherein the second signature is associated with the encoded modified image frame in the second encoded video stream.

8. A method for authenticating an encoded video stream, comprising:

receiving an encoded video stream comprising an encoded image frame;

decoding the encoded image frame into a decoded image frame;

determining difference data from the encoded video stream, the difference data being associated with the encoded image frame;

determining earlier image data using the difference data and the image data of the decoded image frame;

determining a first signature associated with the encoded image frame from the encoded video stream;

validating the first signature using the earlier image data;

determining a second signature associated with the encoded image frame from the encoded video stream; and validating the second signature using the image data of the decoded image frame, wherein the encoded video stream is authenticated only upon the first and second signatures being validated.

9. The method of claim 8, wherein validating the first signature comprises:

decrypting the signature into a first hash value using a public key;

determining a second hash value calculated from the earlier image data; and comparing the first hash value with the second hash value, wherein the first signature is validated upon the first hash value equals the second hash value.

10. The method of claim 8, further comprises:

determining a size of the first difference data; and upon the size of the first difference data exceeding a threshold size, providing a warning of malicious video processing being applied to the encoded video stream.

11. A device for authenticating an encoded video stream, wherein the device comprises one or more processors; and one or more non-transitory computer-readable media storing instructions executable by the one or more processors, and wherein the instructions, when executed, cause the device to perform operations comprising:

receiving an encoded video stream comprising an encoded image frame;

decoding the encoded image frame into a decoded image frame;

determining difference data associated with the encoded image frame from the encoded video stream;

determining earlier image data using the difference data and the image data of the decoded image frame;

determining a first signature associated with the encoded image frame from the encoded video stream;

validating the first signature using the earlier image data, determining a second signature associated with the encoded image frame from the encoded video stream; and validating the second signature using the image data of the decoded image frame, wherein the encoded video stream is authenticated only upon the signature being validated.

12. The device of claim 11 further including a display, wherein the system is configured for displaying the earlier image data on the display.

* * * * *